United States Patent [19]

Nakamura et al.

[11] Patent Number: 4,613,009
[45] Date of Patent: Sep. 23, 1986

[54] WHEEL SUPPORTING STRUCTURE FOR RIDING TYPE WORKING VEHICLES

[75] Inventors: Kenji Nakamura; Tatsuhiko Miura, both of Saitama, Japan

[73] Assignee: Honda Giken Kogyo Kabushiki Kaisha, Tokyo, Japan

[21] Appl. No.: 767,861

[22] Filed: Aug. 21, 1985

[30] Foreign Application Priority Data

Aug. 24, 1984 [JP] Japan ............................... 59-175993
Sep. 14, 1984 [JP] Japan ............................... 59-193325
Feb. 14, 1985 [JP] Japan ............................ 60-18303[U]

[51] Int. Cl.$^4$ .......................... B60G 19/06; B62D 7/06
[52] U.S. Cl. .................................... 180/253; 180/209; 180/256; 180/9.52
[58] Field of Search ............... 180/252, 253, 254, 255, 180/256, 257, 209, 9.5, 9.52; 280/6 R, 6 H, 93

[56] References Cited

U.S. PATENT DOCUMENTS 3,420,327 1/1969 Nallinger et al. .................... 180/255
3,703,215 11/1972 Takahashi ........................... 180/256
3,948,336 4/1976 De Fusco et al. ................... 180/254
4,186,814 2/1980 Hart .................................... 280/6 H Primary Examiner—John J. Love
Assistant Examiner—Donn McGiehan
Attorney, Agent, or Firm—Irving M. Weiner; Joseph P. Carrier; Pamela S. Burt

[57] ABSTRACT

A wheel supporting structure (200, 300, 400) for riding type working vehicles (1) comprises a knuckle holder (80, 90) fixed to a body (2) of the vehicle and formed with a plurality of fixing holes, (83, 84, 85, 93, 94, 95) vertically spaced apart from each other, a knuckle (55, 73) for supporting a ground wheel (7, 8) of the vehicle, and an arm member (59, 77) vertically swingably pivoted at one end thereof on a portion of the vehicle body (2, 40) including the knuckle holder (80, 90) and pivotally connected at the other end thereof to the knuckle (55, 73), and the knuckle (55, 73) is selectively fixed by bolting (99, 309) to one of the fixing holes (83, 84, 85, 93, 94, 95).

7 Claims, 16 Drawing Figures

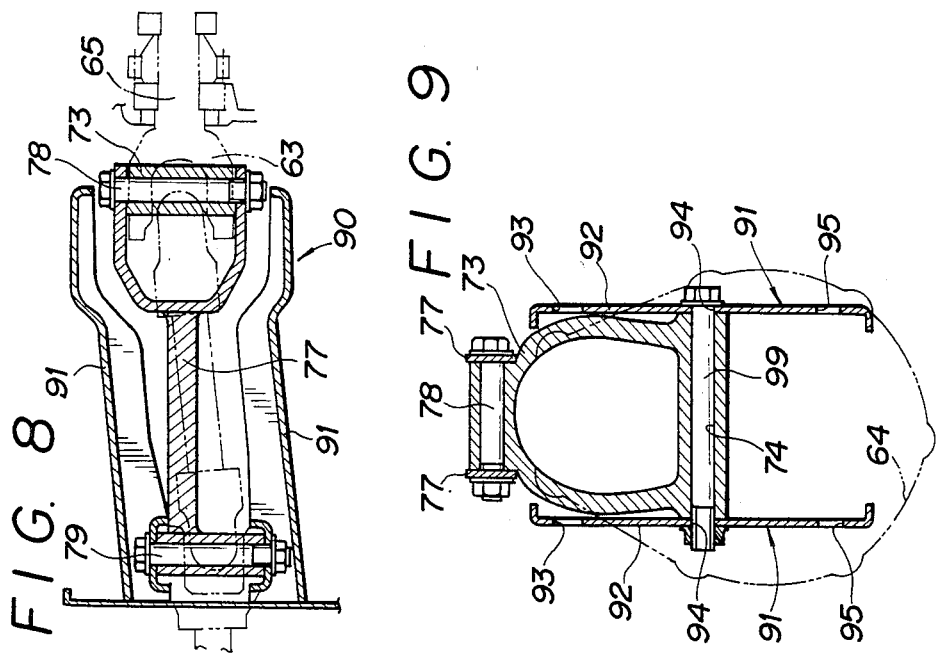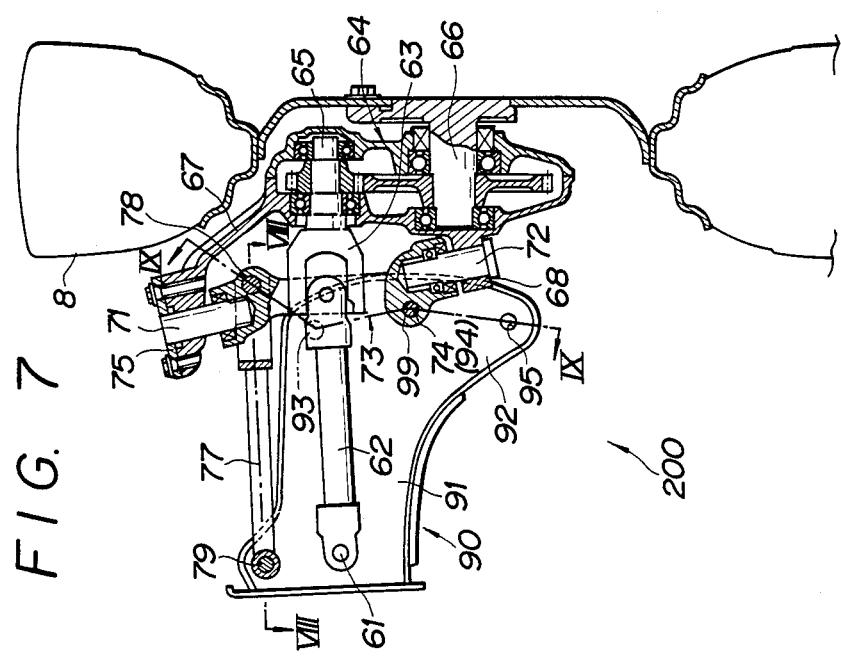

WHEEL SUPPORTING STRUCTURE FOR RIDING TYPE WORKING VEHICLES

BACKGROUND OF THE INVENTION

1. Field of the Invention

The present invention generally relates to a wheel supporting structure for vehicles. More particularly, the invention relates to a wheel supporting structure for riding type working vehicles such as agricultural tractors.

2. Description of Relevant Art

In general, riding type working vehicles, such as agricultural tractors, have front and rear ground wheels, disposed at both sides of such vehicle, which are adapted in various manners for the driving and/or the steering operations of the vehicle. In most of those working vehicles, both the front and rear wheels are adapted to be driven, and in the majority of them the front wheels or sometimes the rear wheels are additionally adapted to be steered, while in the rest thereof both the front and rear wheels are steerable.

In such riding type working vehicles, for each ground wheel needed to be adapted for both driving and steering like above, there generally has been employed a supporting structure including, as in a vehicle proposed by Japanese Utility Model Publication No. 53-4583, published on Feb. 4, 1978, a reduction gearing steerably attached to a king pin and provided with an output shaft for fixing thereto the ground wheel. The reduction gearing includes an input shaft connected through a universal joint to a differential gearing disposed at the longitudinally central part of the vehicle. Such wheel supporting structure is accommodated to the well-known demand that drive wheels for riding type working vehicles should be able to stand producing large tractive forces, when necessary. Incidentally, the vehicle proposed by the Japanese Utility Model Publication No. 53-4583 was a jeep of four-wheel-drive type, in which respective drive wheels were also intended to match up to the demand for strong traction, like the above case.

Moreover, in riding type working vehicles such as agricultural tractors, it has been to enable the alteration or adjustment of vehicle level to be effected in accordance with working conditions. To answer such desideratum, conventionally there have been proposed a number of wheel supporting structures for vehicles which are to be adapted for level adjustment. As an example thereof, there was a wheel supporting structure disclosed by Japanese Utility Model Lay-Open Print No. 55-41991, laid open on Mar. 18, 1980. This supporting structure included a pair of link rods, parallel with each other and different in the length from each other, for the interconnection between a ground wheel and a vehicle body, and a hydraulic power cylinder for adjusting the working position of the parallel linkage, to thereby adjust the vertical position of the ground wheel relative to the vehicle body, permitting the vehicle level to be adjusted.

However, such conventional wheel supporting structures, which needed a power source or more particularly a hydraulic cylinder for use in level adjustment and a mechanism for controlling the hydraulic cylinder, were complicated and expensive. In addition thereto, in the wheel supporting structure according to the Japanese Utility Model Lay-Open Print No. 55-41991, the alteration of vehicle level caused remarkable changes in the camber of the ground wheel, thus adversely affecting the wheel alignment.

As another conventional example of wheel supporting structure adapted for the adjustment of vehicle level, there was one disclosed, to be applied to an agricultural tractor, by Japanese Patent Lay-Open Print No. 59-40909, laid open Mar. 6, 1984. In this supporting structure, a wheel support casing was provided for each of front and rear ground wheels of the agricultural tractor and swingably connected, to be selectively fixed at one of a plurality of predetermined swing positions, to a stationary transmission casing which had accommodated therein a driving shaft extending in the transverse direction of the tractor. In the adjustment of vehicle level, the wheel support casing was swung relative to the transmission casing, to be fixed thereto at the desired one of the swing positions.

In this wheel supporting structure, however, the axis of the driving shaft was not coincident with that of a driving shaft disposed at the side of the wheel support casing. As a result, as the vehicle level was altered, the center of gravity of the vehicle body moved relative to corresponding one of the ground wheels in the longitudinal direction of the tractor, thus giving rise to variations in the feeling of steering operation. Additionally, this wheel supporting structure was, also, complicated and expensive.

Further, like the case of the aforesaid Japanese Patent Lay-Open Print, most agricultural tractors have rear wheels sized larger in the diameter than front wheels, so that, when equipped with such conventional wheel supporting structures, the body of such vehicle tends to rise or fall at the rear part thereof relative to the front part, with the alteration of vehicle level, thus adversely affecting the steering feeling of driver.

The present invention has been achieved to effectively solve such problems of conventional wheel supporting structures for riding type working vehicles.

SUMMARY OF THE INVENTION

According to the present invention, there is provided a wheel supporting structure (200, 300, 400) for a riding type working vehicle (1) including a vehicle body (2) provided with a ground wheel (7, 8), comprising a knuckle holder (80, 90) fixed to the vehicle body (2), the knuckle holder (80, 90) being formed with a plurality of fixing holes (83, 84, 85, 93, 94, 95) vertically spaced apart from each other, a knuckle (55, 73) for supporting the ground wheel (7, 8), an arm member (59, 77) vertically swingably pivoted at one end thereof on a portion of the vehicle body (2) including the knuckle holder (80, 90) and pivotally connected at the other end thereof to the knuckle (55, 73), and a bolt (99, 309) for fastening to fix the knuckle (55, 73) selectively to one of the fixing holes (83, 84, 95, 93, 94, 95).

Accordingly, an object of the present invention is to provide a wheel supporting structure for riding type working vehicles, which permits the level of such vehicle to be easily altered or adjusted by a simple and inexpensive constitution, without the need of using any particular power source, and while enabling the wheel alignment to be kept after such alteration of the vehicle body, substantially as it was before same.

The above and further features, objects and advantages of the present invention will more fully appear from the following detailed description of the preferred embodiments of the invention when the same is read in conjunction with the accompanying drawings.

BRIEF DESCRIPTION OF THE DRAWINGS

FIG. 7 is an enlarged sectional view showing the wheel supporting struture at one of the rear wheels of FIG. 4.

FIG. 8 is a sectional view taken along line VIII—VIII of FIG. 7.

FIG. 9 is a sectional view taken along line IX—IX of FIG. 7.

DETAILED DESCRIPTION OF THE PREFERRED EMBODIMENTS

Figure 1:
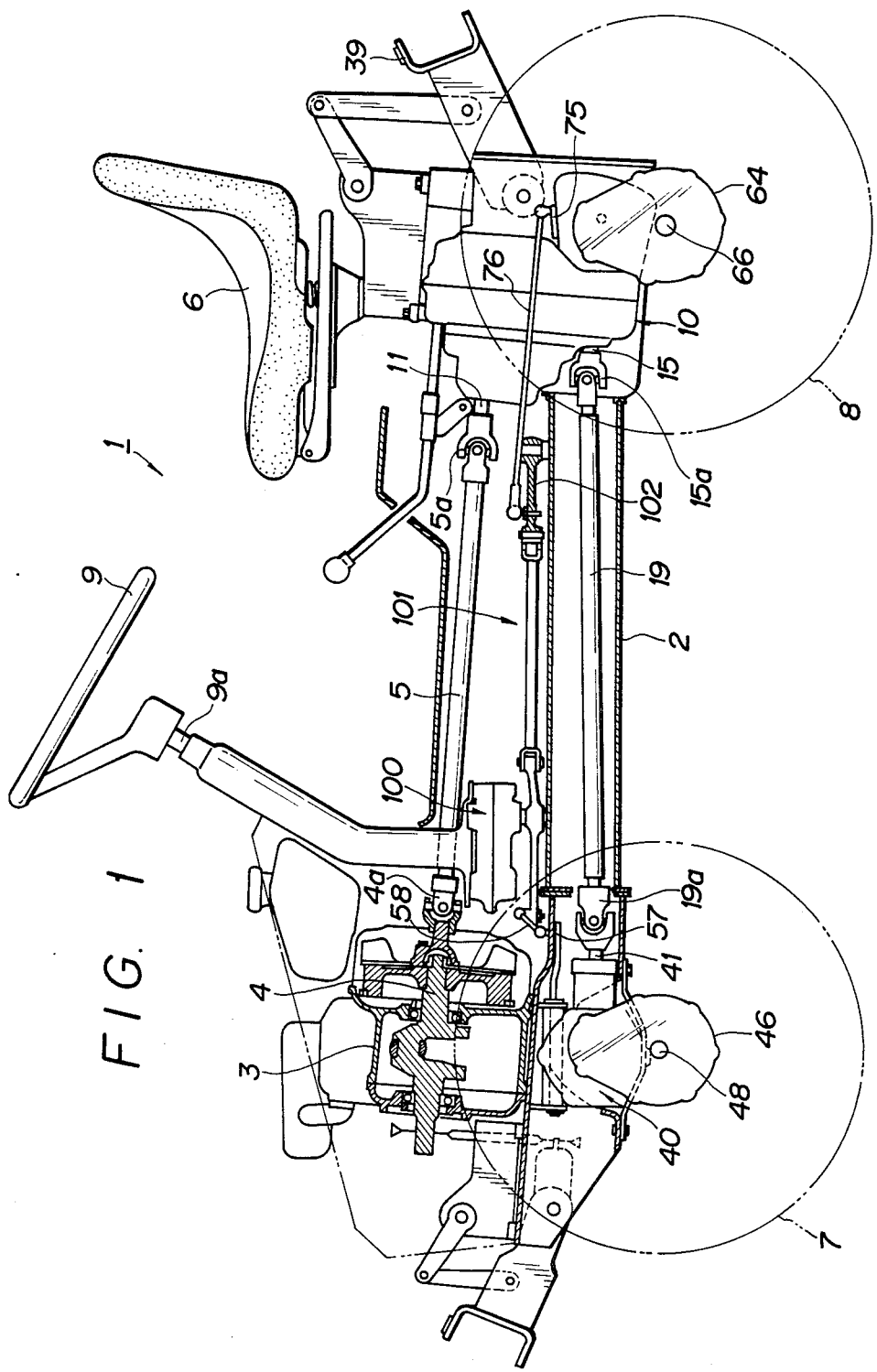
FIG. 1 is a sectional side view of a riding type working vehicle equipped with a wheel supporting structure according to a first embodiment of the present invention.

With reference to FIGS. 1 to 4, designated at reference numeral 1 is the entirety of a riding type working vehicle, such as an agricultural tractor, equipped with front and rear wheel supporting structures according to a first embodiment of the present invention.

Figure 2:
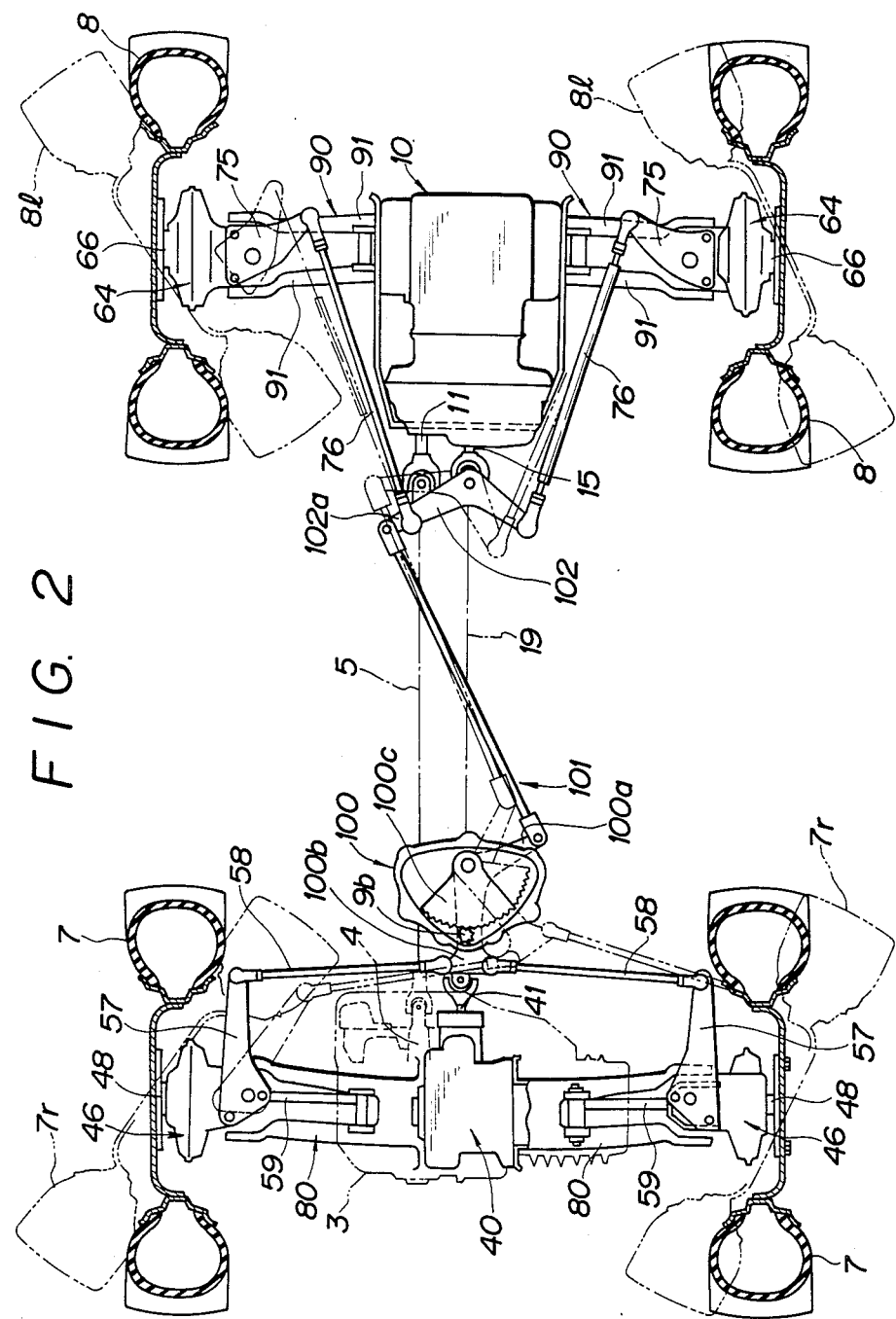
FIG. 2 is a plan view showing, partly in section, a driving system as well as a steering system for front and rear wheels of the riding type working vehicle of FIG. 1.
Figure 3:
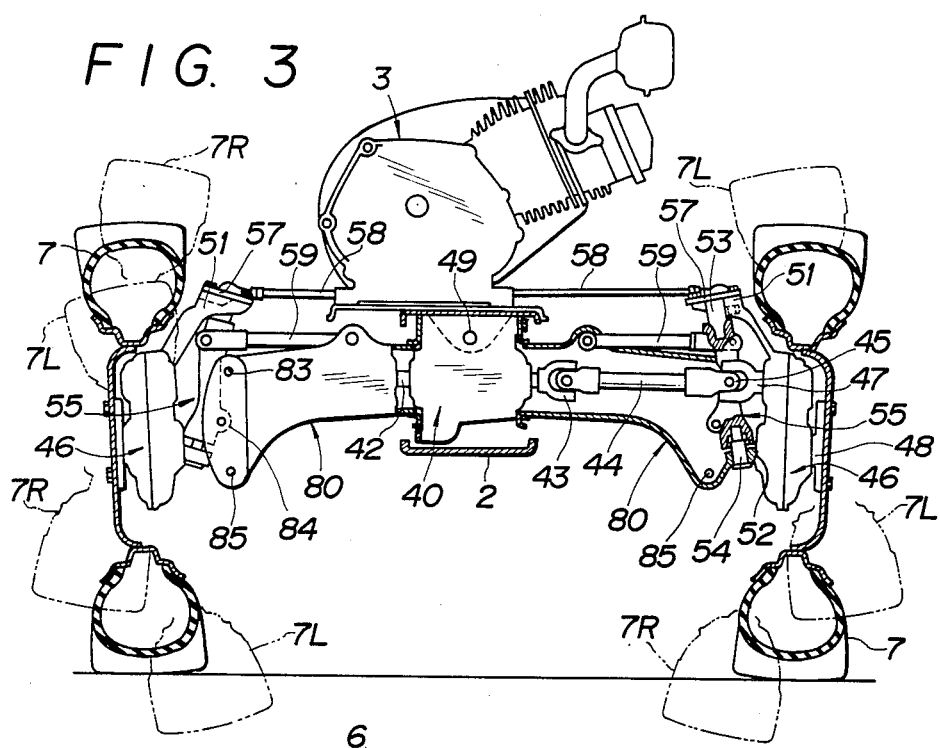
FIG. 3 is a front view showing, partly in section, a wheel supporting structure for each of the front wheels of the riding type working vehicle of FIG. 1.

FIG. 1 is a sectional side view of the riding type working vehicle 1; FIG. 2, a plan view showing a driving system as well as a steering system for front and rear wheels of the working vehicle 1; FIG. 3, a front view showing the front wheel supporting structure of the working vehicle 1; and FIG. 4, a rear view showing the rear wheel supporting structure of the working vehicle 1.

The riding type working vehicle 1 has mounted on the front part of a body frame 2 thereof an engine 3 which is provided with a crankshaft 4 arranged in the longitudinal direction of the vehicle 1. In the rear part of the body frame 2 is disposed a transmission casing 10 having a transmission input shaft 11 interconnected through a propelling shaft 5 to the crankshaft 4, which interconnection is articulated by means of a pair of universal joints 4a, 5a provided at opposite ends of the propelling shaft 5. On the rear part of the body of the vehicle 1 is mounted a seat 6 for a driver to ride on. The front wheels and the rear wheels, designated by reference numerals 7, 7 and 8, 8, are provided at the front and rear of the vehicle body, on the left and right sides thereof, respectively. All of these ground wheels, four in total, are of the same diameter, steerable with a steering wheel 9, and, as will be detailed later, adapted to drive the working vehicle 1 which is thus a four-wheel-drive vehicle as well as a front-and-rear-wheel-steered vehicle.

Figure 5:
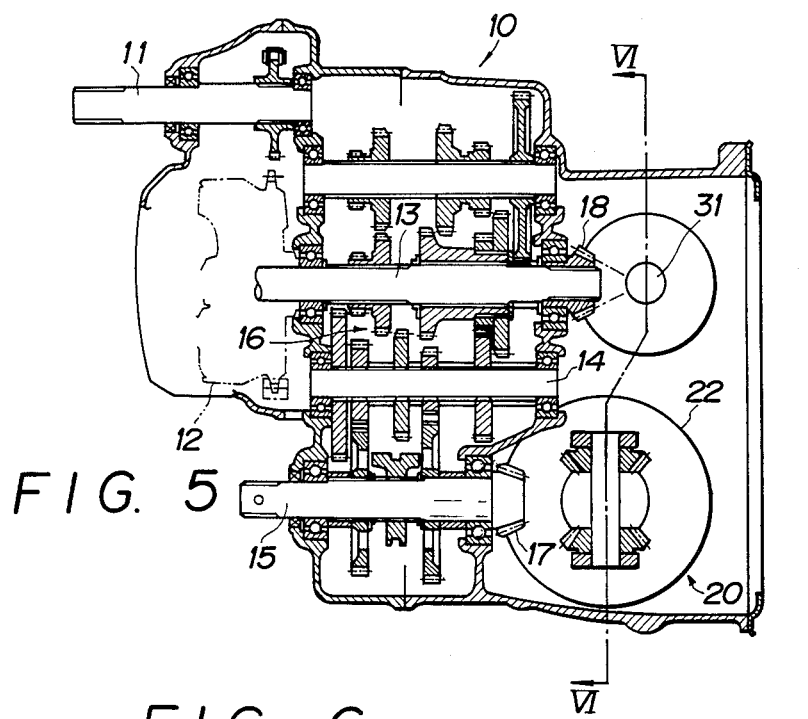
FIG. 5 is an enlarged longitudinal sectional view of a transmission casing of the riding type working vehicle of FIG. 1.

The interior of the transmission casing 10 is as shown in FIG. 5. The transmission input shaft 11 is connected to a main shaft 13, through a chain-and-sprocket drive and clutch mechanism 12, thus in a manner capable of disconnection as well as interconnection therebetween of drive power the engine 3. Between from the main shaft 13 and an idle shaft 14, and from the idle shaft 14 to an output shaft 15, there is interposed a group of shiftable reduction gear trains 16.

The transmission output shaft 15 is connected at the front end thereof, by means of a propelling shaft 19 with a pair of universal joints 15a, 19a disposed at opposite ends thereof, to an input shaft 41 of a front differential 40 located at the front of the vehicle body, under the engine 3.

Figure 6:
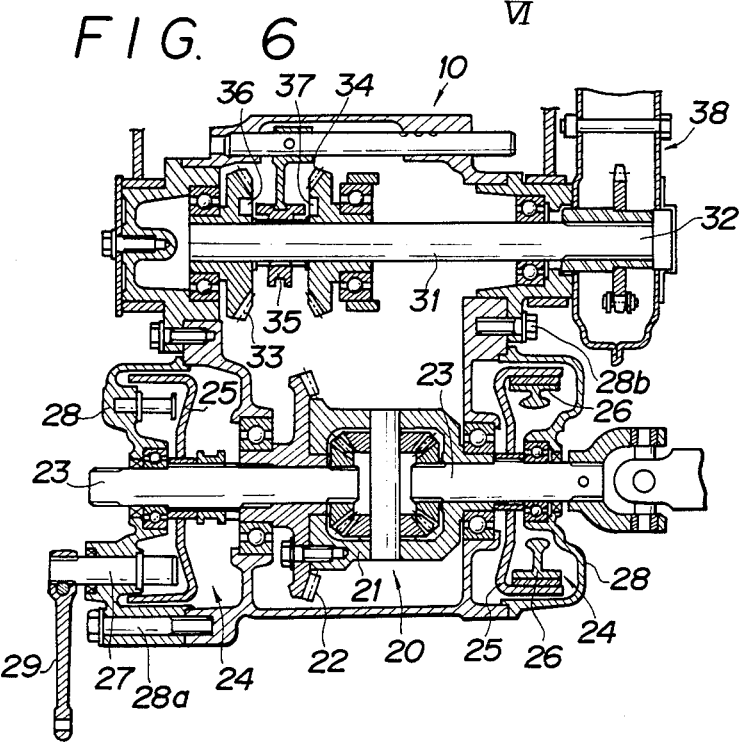
FIG. 6 is a cross-sectional rear view of the transmission casing, taken along line VI—VI of FIG. 5.

At the rear end of the transmission output shaft 15 is provided a bevel gear 17 engaged, as shown in FIG. 5, in a perpendicularly meshing manner with another bevel gear 22 assembled, as shown in FIG. 6, to be integral with a housing 21 of a rear differential 20. The differential 20 has left and right rear wheel driving shafts 23, 23 transversely projecting therefrom, the shafts 23, 23 being provided with a pair of drum brakes 24, 24 fixed thereon, respectively. More particularly, each of the shafts 23, 23 has at the middle part thereof one of a pair of brake drums 25, 25 spline-fitted thereon, and one of a pair of brake covers 28, 28 extending therearound and fastened by bolts 28a to side walls of the transmission casing 10; the covers 28 being each respectively adapted to hold therein a plurality of brake shoes 26 and a cam shaft 27 for radially outwardly actuating the brakes shoes 26. The shaft 27 is outwardly projected from the cover 28 and has fixed on the distal end thereof one end of an operating arm 29 connected at the other end thereof to a brake lever (not shown). The front wheel driving shafts 23, 23 are leftwardly and rightwardly projected out of the central parts of the brake covers 28, 28, respectively.

Figure 4:
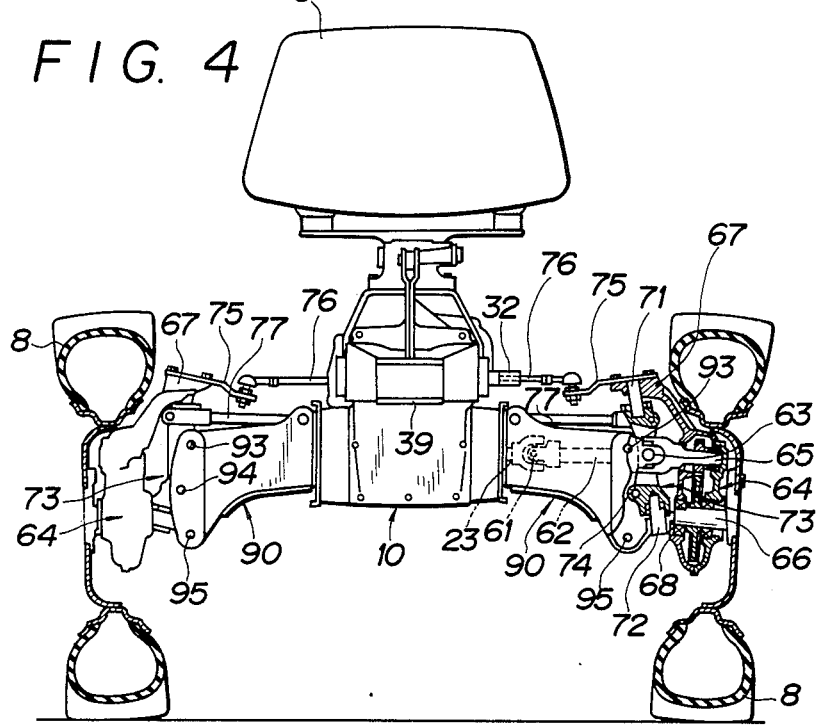
FIG. 4 is a rear view showing, partly in section, a wheel supporting structure for each of the rear wheels of the riding type working vehicle of FIG. 1.

Moreover, also at the rear end of the main shaft 13 is provided a bevel gear 18, as shown in FIG. 5, which is, as will be seen from FIG. 6, engaged with a pair of bevel gears 33, 34 disposed at the left and right thereof. The bevel gears 33, 34 being loose-fitted on, while restricted and nonslidable in the axial direction of, a power take-out shaft 31 horizontally extending in the transverse direction of the vehicle body and perpendicularly to the main shaft 13. The power take-out shaft 31 has spline-fitted thereon, between the left and right bevel gears 33, 34, an axially slidable shifter 35, which is adapted, by means of left and right dog clutches 36, 37 with claws formed thereon, to be selectively engaged with one of the bevel gears 33, 34 or disengaged from both thereof, so that the shaft 31 is driven into forward or reverse rotation, or not rotated at all. One end portion 32 of the power take-out shaft 31 is outwardly projected from the side wall of the transmission casing 10, to have fixed thereon another transmission 38 operatively connected to a working implement (not shown). In FIG. 4 the transmission 38 is cut away for convenience in clearly representing the essential parts of the rear wheel supporting structure.

The working implement is vertically movably supported with a hitch 39 provided at the rear of the vehicle body, as shown in FIG. 1.

As shown in FIG. 3, the front differential 40 has at the left and right sides thereof, each respectively, a front wheel driving shaft 42 connected through a universal joint 43 to the inner end of an interconnection shaft 44, which in turn is connected at the outer end thereof through a universal joint 45 to an input shaft 47 of a reduction gearing 46, the gearing 46 being provided with an output shaft 48 as an axle to fix thereon one of the front wheels 7. The reduction gearing 46 has formed on the casing thereof, at the transversely inner side thereof with respect to the vehicle body, upper and lower brackets 51, 52 projecting therefrom. The brackets 51, 52 being pivoted at the distal ends thereof, by means of upper and lower king pins 53, 54 which are colinearly, axially aligned to each other, on the upper and lower ends of a knuckle 55, respectively, while the upper bracket 51 has fixed to the distal end thereof the base end of a knuckle arm 57. Moreover, between the knuckle 55 and a knuckle holder 80 for holding in position the knuckle 55 in a later described manner, there is interposed a vertically swingable upper arm 59 pivoted at the transversely outer end thereof on the upper part of the former 55 and at the transversely inner end thereof on the latter 80.

As shown in FIGS. 1 and 2, the knuckle arm 57 at the left front wheel 7 and that 57 at the right front wheel 7 are articulably connected at the free ends thereof, through left and right front tie rods 58, 58 respectively, to a pitman arm portion 100b formed at the front end of a pivotal arm 100a. Arm 100a is fixed at the middle part thereof on an output shaft of a steering gearbox 100 and articulated at the rear end thereof with the front end of a steering linkage 101 extending substantially in the longitudinal direction of the vehicle body.

Also at the rear of the vehicle body, as shown in FIG. 4, each of the left and right rear wheel driving shafts 23, 23 outwardly projecting from the transmission casing 10 is connected through a universal joint 61 to the inner end of an interconnection shaft 62, which in turn is connected at the outer end thereof through a universal joint 63 to an input shaft 65 of a reduction gearing 64. The gearing 64 being provided with an output shaft 66 as an axle to fix thereon one of the rear wheels 8. Similarly to the front reduction gearing 46, the rear reduction gearing 64 has formed on the casing thereof upper and lower brackets 67, 68 pivoted, by means of upper and lower king pins 71, 72 which are colinearly, axially aligned to each other, on the upper and lower ends of a knuckle 73, respectively, while to the upper bracket 67 is integrally fastened to the base end of a knuckle arm 75. Between the knuckle 73 and a knuckle holder 90 for holding the knuckle 73 in a later described manner, there is interposed a vertically swingable upper arm 77 pivoted at the outer end thereof on the upper part of the former 73 and at the inner end thereof on the latter 90.

As shown in FIGS. 1, 2, the knuckle arm 75 at the left rear wheel 8 and that arm 75 at the right rear wheel 8 are articulably connected at the free ends thereof, through left and right rear tie rods 76, 76 respectively, to the rear end of the steering linkage 101.

Incidentally, as shown in FIG. 3, the front differential 40 is accommodated in a housing transversely rockably suspended by means of a longitudinal pivot pin 49 fixed to the transversely central part of the body frame 2, which housing has fixed thereto the front knuckle holders 80, 80 at opposite sides thereof. Designated at reference characters 7L, 7R are respective upper and lower positions that the left and right front wheels 7, 7 adjust to when vertically swung with the transverse rocking of the front differential housing.

Likewise, as shown in FIG. 4, the transmission casing 10 has fixed to the rear part thereof the rear knuckle holders, 90, 90 at opposite sides thereof.

Further, at each of the left and right sides of the front differential 40, the universal joint 45 articulating the interconnection shaft 44 with the reduction gearing 46 is arranged so as to have the axis thereof cross the colinear centerlines of the upper and lower king pins 53, 54.

Likewise, at each of the left and right sides of the transmission casing 10, the universal joint 63 articulating the interconnection shaft 62 with the reduction gearing 64 has the axis thereof arranged to cross the colinear centerlines of the upper and lower king pins 71, 72.

There will be described hereinbelow the constitution of the knuckle holders 80, 90, the pivoting structure of the upper arms 59, 77, and the fixing structure of the knuckles 55, 73, with reference to FIGS. 7 to 9, while the description will be made of the rear wheel supporting structure which is analogous to the front wheel supporting structure.

The rear knuckle holder 90 comprises front and rear holder plates 91, 91 which are highly rigid, the holder plates 91, 91 having interposed between the base parts thereof a bolt 79, on which the upper arm 77 is vertically swingably pivoted at the inner end thereof. The outer end of the arm 77 is pivoted by means of a bolt 78 on the upper part of the rear knuckle 73.

In the lower part of the knuckle 73 is formed a bolt insertion hole 74, on one hand; and, on the other hand, the holder plates 91 have formed in side portions 92 thereof respective pair of upper, middle, and lower fixing holes 93, 94, 95 coaxial with each other, respectively, at such predetermined points on the portions 92 that the bolt insertion hole 74 of the knuckle 73 becomes coincident therewith when the rear wheel 8 is vertically translated without changing the camber angle thereof.

In this respect, FIGS. 7 and 9 show such a knuckle position that the bolt insertion hole 74 of the knuckle 73 coincides with the middle fixing holes 94 of the knuckle holder 90, while in FIG. 7 the rear holder plate 91 is cut away for the convenience of comprehensive representation. The knuckle 73 is fastened to the knuckle holder 90, with a fixing bolt 99 provided through the bolt insertion hole 74 and set at the middle fixing holes 94. At this knuckle position, the vehicle 1 has a middle level.

Figure 10:
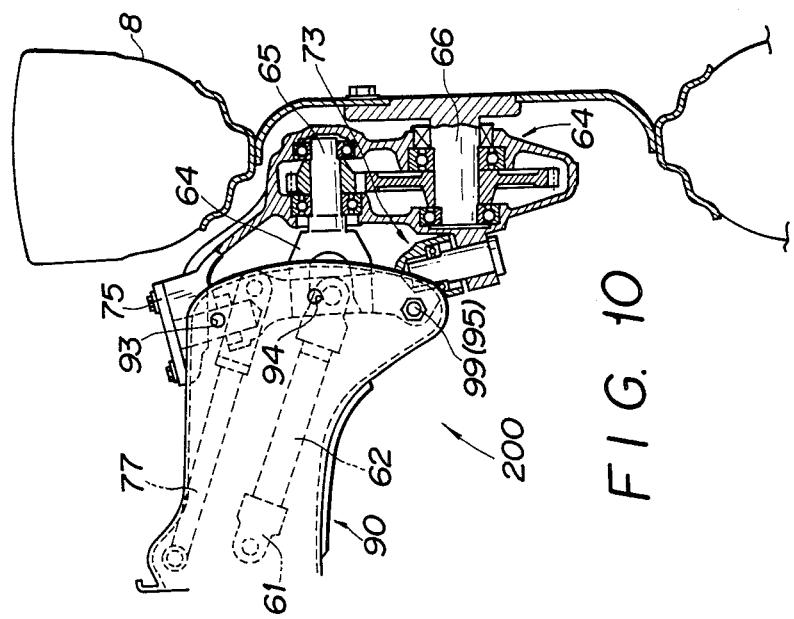
FIG. 10 is a view similar to FIG. 7, showing the rear wheel supporting structure, as it is set for a high vehicle level.

FIG. 10 shows another knuckle position, in which the knuckle 73 is fixed to the knuckle holder 90 by using the lower fixing holes 95. Accordingly, this knuckle position corresponds to a high vehicle level.

Figure 11:
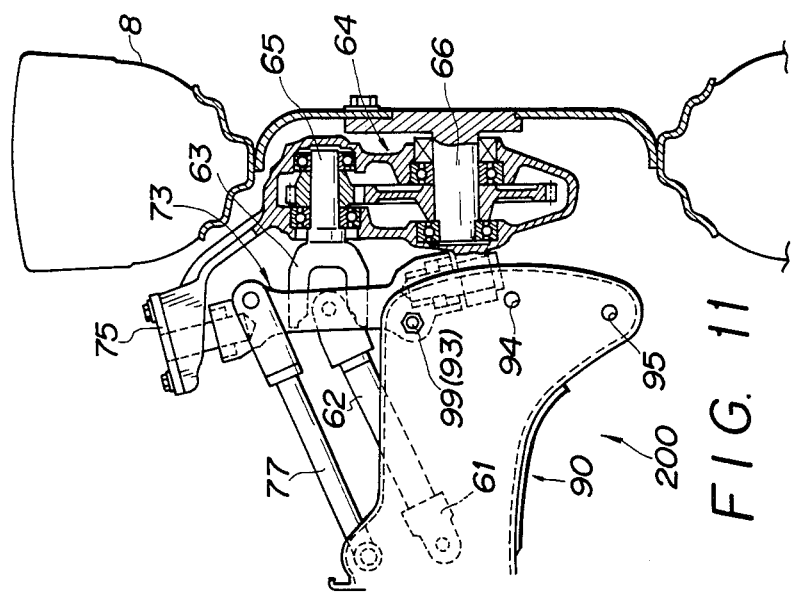
FIG. 11 is a view similar to FIG. 7, showing the rear wheel supporting structure, as it is set for a low vehicle level.

In FIG. 11, the knuckle 73 is bolted to the upper fixing holes 93 of the knuckle holder 90, so that the vehicle level is set low.

Incidentally, the foregoing level adjustment of the vehicle 1 is effected by lifting the body frame 2 with a jack.

Hereinbelow, there will be briefly described a driving system as well as a steering system of the front and rear wheels 7, 8 in the riding type working vehicle 1.

The driving power from the engine 3 is transmitted, through the propelling shaft 5, first to the gearing in the transmission casing 10, whereby the transmission output shaft 15 is driven to rotate at a speed reduction ratio in accordance with the shifting of the reduction gear trains 16. Driving torque of the transmission output shaft 15 is transmitted through the rear differential 20 to the rear wheel driving shafts 23 and further, from each of these shafts 23, through the universal joint 61, interconnection joint 62, and universal joint 63 to the input shaft 65 of the rear reduction gearing 64. The torque as transmitted to the input shaft 65 is reduced in speed by the gearing 64 and output from the output shaft 66, thereby rotating the rear wheel 8.

Concurrently with the transmission to the respective rear wheels 8, the driving torque of the transmission output shaft 15 is transmitted through the universal joint 15a, propelling shaft 19, and universal joint 19a to the input shaft 41 of the front differential 40. The transmission system from the differential input shaft 41 to the respective front wheels 7 is analogous to that from the transmission output shaft 15 to the rear wheels 8 and will not be further described.

In the above described manner, the front and rear wheels 7, 8 of the working vehicle 1 are all driven.

On the other hand, as shown in FIGS. 1 and 2, the steering gearbox 100 has accommodated therein a steering gear 9b rotatable with rotation of a steering shaft 9a fixed with the steering wheel 9, and a sector gear portion 100c of the pivotal arm 100a, the gear portion 100c being engaged with the steering gear 9b. Accordingly, when the steering wheel 9 is rotated by the driver's steering operation, the steering gear 9b will be rotated, causing the sector gear portion 100c to horizontally rotate about a pivot shaft 100d thereof, which shaft 100d is the aforesaid output shaft of the gearbox 100.

The pitman arm portion 100b as the front end of the pivotal arm 100a is connected through the left and right front tie rods 58 to the left and right front knuckle arms 57, respectively. The rear end of the pivotal arm 100a is connected through the steering linkage 101 to one end of a bell crank 102 pivoted at the centeral part thereof on the rear part of the vehicle body. The bell crank 102 is further connected at both ends thereof through the left and right rear tie rods 76 to the left and right rear knuckle arms 75, 75, respectively. At each of the left and right sides of the vehicle body, the front knuckle arm 57 is fixed to the front reduction gearing 46 supporting the front wheel 7. Likewise, the rear knuckle arm 75 is fixed to the rear reduction gearing 64 supporting the rear wheel 8.

In the foregoing steering system, when the steering wheel 9 is operated, the front and rear wheels 7, 8 are steered in a simultaneous manner. In this embodiment, the steering lingkage 101 is connected at the front end thereof to the free end of such arm portion of the pivotal arm 100a that extends leftwardly of the vehicle 1 and at the rear end thereof to the free end of an arm portion 102a of the bell crank 102, which portion 102a is extended rightwardly of the vehicle 1, so that the front and rear wheels 7, 8 are adapted to be steered in opposite directions to each other.

For example, when the steering wheel 9 is turned to the right to bring the front wheels 7 into right-steered positions 7r thereof, the rear wheels 8 are turned in the opposite direction to the front wheels 7, that is, turned to the left to be brought into left-steered positions 8l thereof.

As will be understood from the foregoing description, according to the first embodiment, the rear wheel supporting structure, designated by reference numeral 200, as well as the front wheel supporting structure which is analogous thereto in constitution, has a relatively small number of component parts and, besides, permits the adjustment of vehicle level by simply changing the setting position of a single bolt (99) while lifting the vehicle body with a jack.

In this respect, the present wheel supporting structures need no power source for the adjustment of vehicle level, thus achieving facilitation of structural simplification as well as of reduction in cost. The structural simplification in turn permitting facilitations of level adjustment work and maintenance service.

Moreover, the fixing holes 93, 94, 95 for the rear knuckle 73 are formed in the rear knuckle holder 90, at predetermined points thereon, thus facilitating the setting of knuckle fixing positions for the adjustment of vehicle level.

Further, the front and rear knuckles 55, 73 are permitted to be vertically displaced relative to the front and rear knuckle holders 80, 90, respectively, without the need of providing longitudinal displacement, so that the vehicle level can be adjusted without varying the wheel base.

Furthermore, the fixing holes 93, 94, 95 for fixing the rear knuckle 73 to the rear knuckle holder 90, as well as fixing holes 83, 84, 85 for fixing the front knuckle 55 to the front knuckle holder 80, are arranged such that the upper and lower fixing holes are located nearer to the base frame 2 than the middle fixing hole. Accordingly, when the setting position of vehicle level is altered, and although the tread might be somewhat changed, there is substantially no necessity of adjusting the length of the front and rear tie tods 58, 76, and almost no variations in the wheel alignment.

Incidentally, in the foregoing arrangement, the number of fixing holes formed in each knuckle holder 80, 90 may preferably be increased to thereby increase the number of setting positions for the adjustment of vehicle level. Moreover, instead of fixing with a single bolt (99), a plurality of fixing bolts may advantageously be employed for setting the vehicle level. Further, the upper arms 59, 77 may have transversely inner ends thereof pivoted on the body frame 2.

Still more, according to the first embodiment, the universal joint 45 or 63 is arranged so as to have the center thereof coincident with the centerline of the king pins 53, 54 or 71, 71, respectively, thus permitting the articulation between the interconnection shaft 44 or 62 and the input shaft 47 or 65 of the reduction gearing 46 or 64 to be made smoothly in the steering operation as well as in the adjustment of the vehicle body, respectively.

Yet more, according to the first embodiment in which the drum brakes 24, 24 are mounted on the rear wheel driving shafts 23, 23 in the transmission casing 10, the brakes 24, 24 can be accommodated in the transmission casing 10 in a compact manner. Further, in this first embodiment in which the reduction gearing 64 is provided at the side of each rear wheel 8, the transmission casing 10 is permitted to effectively raise the bottom level from the ground, thereby securing the necessary lowest vehicle level from the ground. In addition thereto, in this embodiment in which also at the side of each front wheel 7 is provided the reduction gearing 46, the differential casing 40 is likewise permitted to raise the bottom level from the ground, whereby also the lowest vehicle level can be secured to be sufficient.

Still further, the front and rear wheel driving shafts 42 and 23 are connected, through the interconnection shafts 44 and 62 having the universal joints 43, 45 and 61, 63 provided at opposite ends thereof, to the input shafts 47 and 65 of the reduction gearings 46 and 64 at the front and rear wheels 7 and 8, respectively, so that the interconnection shafts 44 and 62 can be swung at large angles, thus effectively permitting the employment of a wide setting range for the adjustment of vehicle level.

Yet further, in the power transmission system, the interconnection shafts 44 and 62 are disposed before the reduction gearings 46 and 64, respectively, so that driving torque acting on the interconnection shafts 44, 62 can be set small, thus permitting the shafts 44, 62 to be sized narrow, thereby achieving light-weighted design.

Figure 13:
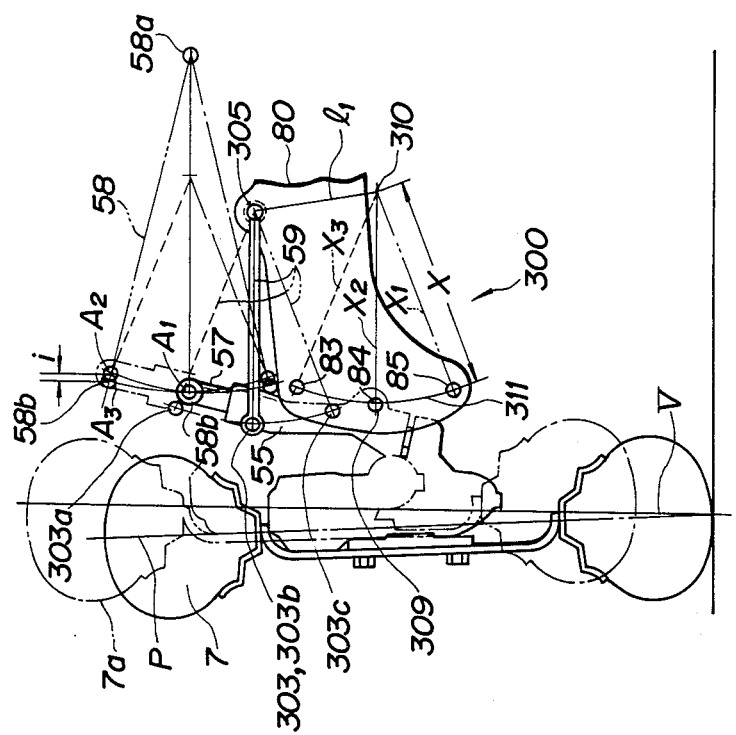
FIG. 13 is a front view of the wheel supporting structure shown in FIG. 12.
Figure 12:
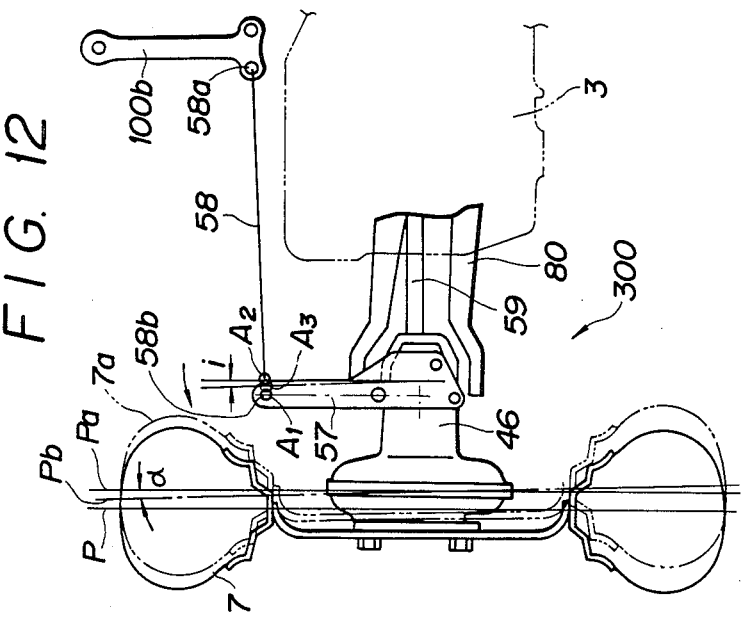
FIG. 12 is a partly cut-away plan view showing the front wheel supporting structure of FIG. 3, for explaining wheel-toe variations attendant the adjustment of vehicle level.

FIGS. 12 and 13 are plan and front views of the front wheel supporting structure, designated by reference numeral 300, as it is before and after the adjustment of vehicle level, respectively. The wheel supporting structure 300 is shown as that applied to the right front wheel 7.

In FIGS. 12, 13, desinated at reference characters 58a and 58b are ball joints for pivotably attaching the transversely inner and outer ends of the front tie rod 58 to the pitman arm portion 100b and the knuckle arm 57, respectively; and 303a, 303b, and 303c are predetermined locations of a pivot point 303 on the knuckle 55, where the transversely outer end of the upper arm 59 is to be pivoted, when the vehicle level is set low, middle, and high, respectively.

Incidentally, in FIG. 13, for easy comprehension of relative positional relation between the knuckle 55 and the knuckle arm 57, the knuckle arm 57 is given in a simplified form and the king pins 53 are omitted.

As aforementioned, the fixing holes 83, 84, 85 for fixing the knuckle 55 to the knuckle holder 80 by using a bolt 309 are formed at such points on the knuckle holder 80 that the camber angle of the front wheel 7 is kept even when the vehicle level is altered. Therefore, the fixing holes 83, 85, 85 are formed in the knuckle holder 80 at such points thereon that lie on a circle arc 311 with respect to an imaginary center 310 in FIG. 13. The distance from the imaginary center 310 to the respective fixing holes 83, 84, 85, that is, the radius of the circle arc 311, designated by reference character X, is equal to the distance between the pivot point 303 at the outer end of the upper arm 59 and another pivot point 305 at the inner end thereof. Those radial lines X1, X2, X3 about the imaginary center 310 which pass the fixing holes 85, 84, 83, respectively, are parallel with those line segments interconnecting the inner pivot point 305 with the outer pivot point 303 when the vehicle level is set in respective high, middle, and low positions, that is, line segments 305-303c, 305-303b, and 305-303a, respectively. When supposing the knuckle holder 80 as a reference, the inner pivot point 305 of the upper arm 59 and the imaginary center 310 have stretched therebetween a line segment 11 always kept at a constant position irrespective of the vehicle level. The position of the imaginary center 310 depends on the location of the fixing holes formed for insertion of the bolt 309 in the knuckle 55. The pivot points 305, 303, the bolt 309 and the imaginary center 310 cooperate together to constitute four articular points of such an imaginary four-sided parallel linkage that includes the line segment 11 as a stationary side thereof.

In the foregoing arrangement of the wheel supporting structure 300, the tie rod 58 has a pivot point 58b thereof on the knuckle arm 57, which pivot point 58b occupies the position of point A1 when the vehicle level is set middle, that is, when the knuckle 55 is fixed by the bolt 309 to the middle fixing hole 84.

When the setting is altered from the above state to low vehicle level, that is, when the knuckle 55 is replaced to be fixed by the bolt 309 to the upper fixing hole 83, there will be kept the camber angle as well as the toe angle of the front wheel 7, if the front wheel 7 and the pivot point 58b move to points 7a and A2, respectively. Incidentally, in FIGS. 12, 13, represented by reference characters P and Pa are the center plane that the front wheel 7 has when the vehicle level is set middle and that when the front wheel 7 is located at the point 7a, respectively.

However, since the tie rod 58 is arranged in the transverse direction of the vehicle body and dimensioned to be longer than the upper arm 59, the pivot point 58b takes the position of point A3, when the vehicle level is set low. In FIGS. 12, represented by reference character Pb is the center plane of the front wheel 7 when the pivot point 58b has come to the point A3. In FIG. 13, represented by reference character V is a vertical plane.

Accordingly, when the vehicle level is changed from middle level to low level, the front wheel 7 turns counterclockwise in FIG. 12 about the king pins, causing the center plane P thereof to be inwardly inclined on the front side at an angle $\alpha$ corresponding to the distance i between the points A2 and A3. In other words, the front wheel then has a toe-in angle increased by the angle $\alpha$.

As will be seen, also when the vehicle level is changed from middle level to high level, the front wheel 7 has an increased toe-in angle.

Consequently, in the front wheel supporting structure 300, when the vehicle level is altered, the toe-in angle of the front wheel 7 is changed, since the transverse length of the tie rod 58 is larger than that of the upper arm 59.

In this respect, in the rear wheel supporting structure 200, the toe angle of the rear wheel 8 is substantially kept unchanged even when the vehicle level is altered. As will be understood from the layout of the rear tie rod 76 shown in FIG. 2, such effect stands on the possible variation that the tie rod 76 has in the transverse length thererof depending on the alteration of vehicle level.

When taking into consideration the travelling condition of the riding type working vehicle 1 which in fact is seldom driven into high-speed travelling, the toe angle variation attendant the vehicle level alteration will not constitute a substantial problem. However, there may be the case in which no variation of front toe angle is preferred in the alteration of vehicle level.

Figure 14:
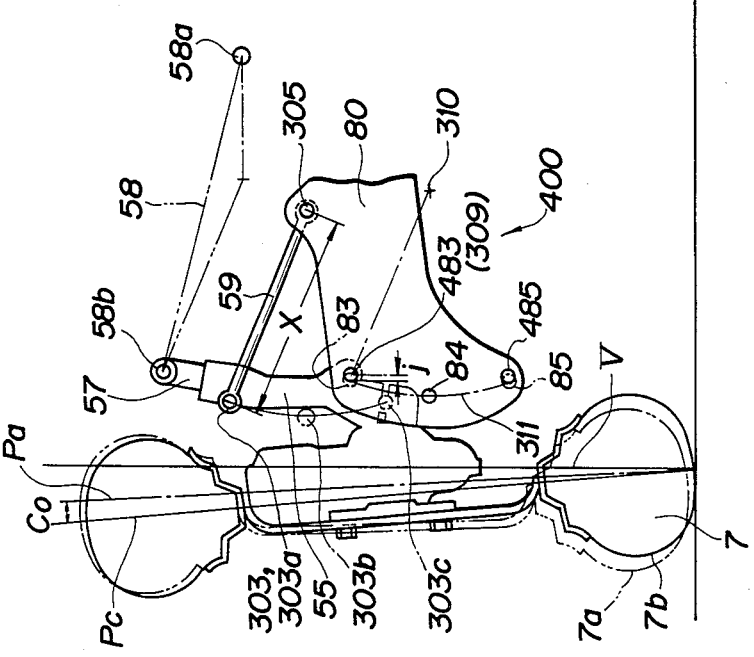
FIG. 14 is a front view of a wheel supporting structure according to a modification of the first embodiment of the present invention.

FIG. 14 shows a front wheel supporting structure 400 according to a modification of the first embodiment of the present invention, in which upper, middle, and lower fixing holes 483, 84, 485 formed in a knuckle holder 80 are arranged at such points thereon that a front wheel 7 experiences no variations of toe angle even when the vehicle level is altered. In FIG. 14, like parts are designated by like reference characters in relation to FIGS. 12 and 13.

In the wheel supporting structure 400, the upper fixing hole 483 is deviated toward an imaginary center 310 by a distance j from a position corresponding to the upper fixing hole 83 in FIG. 13.

As in FIG. 12, when the vehicle level is set low, a tie rod 58 has a pivot point 58b thereof situated in an outer position of point A3 at a distance i from point A2, whereby only the rear end of a knuckle arm 57 is outwardly deviated by the distance i from a predetermined position at which the toe angle could be maintained. As a result, the front wheel 7 is caused to turn about king pins 53, 54, thus increasing the toe-in angle.

Therefore, in order to keep the toe angle of the front wheel 7 even when the vehicle level is altered from middle level to low level, it is also necessary to outwardly displace the front end of the knuckle arm 57 by the distance i.

In this respect, for the necessary outward displacement of the front end of the knuckle arm 57, that part of a knuckle 55 which extends under a pivot point 303 of an upper arm 59 must move inwardly around the pivot point 303.

The position of the upper fixing hole 483 is determined in such a manner as to meet the above requirement and, hence, the distance j depends on the ratio of the distance between the pivot points 58b and 303 to that between the pivot point 303 and another pivot point 309. Also, the position of the lower fixing hole 485 in the knuckle holder 80 is determined in a manner similar to that for the upper fixing position 483.

As will be understood, in the modification according to FIG. 14, when the vehicle level is set low, the front wheel 7 comes to the position of solid line 7b, so that the camber angle thereof is increased by an angle Co when compared with the case in which the front wheel 7 has come to the position 7a. Incidentally, in FIG. 14, represented by reference character Pc is the center plane of the front wheel 7 as put in the position 7b.

In the foregoing front wheel supporting structure 400 in which the tie rod 58 has a longer transverse length than the upper arm 59, the upper and lower fixing holes 483, 485 of the knuckle holder 80 are inwardly displaced by the distance j from the positions of the fixing holes 83, 84 of the first embodiment.

In the case where the tie rod 58 has a shorter transverse length than the upper arm 59, the respective positions of the fixing holes 83, 84 may preferably be deviated to be located outside of the circle arc 311 with respect to the imaginary center 310.

According to the front wheel supporting structure 400, the toe angle of the front wheel 7 is maintained even when the vehicle level is altered, thus making the adjustment of wheel alignment unnecessary, contributing to the facilitation of vehicle level adjustment.

Figure 15:
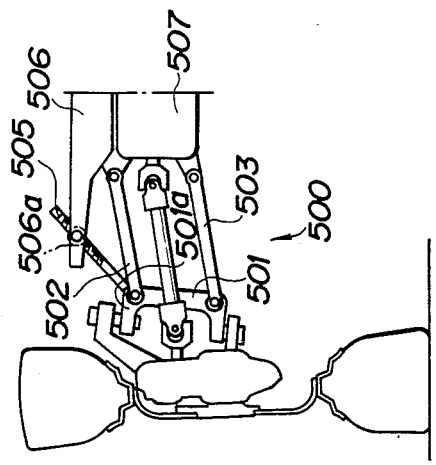
FIG. 15 is a front view of a wheel supporting structure according to a second embodiment of the present invention.

FIG. 15 is a plan view of a wheel supporting structure 500 according to a second embodiment of the present invention.

In the wheel supporting structure 500, a knuckle 501 is supported by a body frame 506, in a vertically translatable manner, through a pair of parallel links 502, 503 dimensioned to be substantially of the same length, while an upper portion 501a thereof is connected through an adjust bolt 505 to the body frame 506, the adjust bolt 505 being screwed into a famale-thread portion 506a of the body frame 506, which portion 506a is adapted to be clockwise and counterclockwise rotatable relative to the remaining part of the body frame 506.

Accordingly, the knuckle 501 has relative to the body frame 506 a level difference adjustable by rotating the adjust bolt 505 while lifting the vehicle body with a jack, to thereby alter or adjust the vehicle level.

Incidentally, in FIG. 15, to eliminate the redundancy, those parts analogous with respect to the first embodiment are intentionally shown or unshown, omitting the reference characters and description, whereas designated at reference numeral 507 is a transmission casing.

Also the wheel supporting structure 500 is applicable to such respective ground wheels as driven and steered in riding type working vehicles.

In the wheel supporting structure 500, the paired links 502, 503 are not always needed to be parallel with each other nor dimensioned in the same length, and may follow a voluntary arrangement in which an unshown tie rod is not greatly variable in transverse length when the vehicle level is altered.

Figure 16:
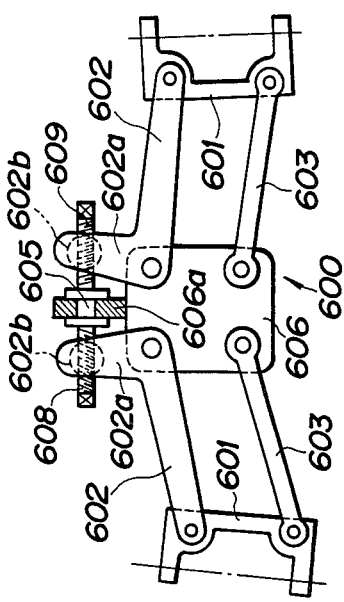
FIG. 16 is a front view of a wheel supporting structure according to a third embodiment of the present invention.

FIG. 16 is a plan view of a wheel supporting structure 600 according to a third embodiment of the present invention.

In the wheel supporting structure 600, left and right knuckles 601, 601 are supported by a body frame 606, in a vertically translatable manner, through left and right parallel linkages each respectively consisting of respective ones of paired upper and lower links 602, 603 parallel with each other and dimensioned to be substantially of the same length. The upper links 602, shaped in a bell crank form, have upper arms 602a, 602a thereof opposing each other in the transverse direction of the vehicle body, while an adjust bolt 605 of restricted axial movement is put therebetween to have right and left thread portions 608, 609 thereof screwed to be inserted through the upper arms 602a, 602a, respectively. The central part of the adjust bolt 605 is provided through a standing portion 606a projecting from the body frame 606; and the right and left thread portions 608, 609 thereof are screwed into female-thread portions 602b, 602b of the upper arms 602a, 602a, which female-thread portions 602b, 602b are adapted to be clockwise and counterclockwise rotatable relative to the upper arms 602a, 602a.

Accordingly, the left and right knuckles 601 have, relative to the body frame 606, level differences thereof simultaneously adjustable by rotating the adjust bolt 605 while lifting the vehicle body with a jack, to thereby alter or adjust the vehicle level.

Incidentally, also in FIG. 16, to eliminate the redundancy, those parts analogous with respect to the first embodiment are intentionally unshown.

In the wheel supporting structures 500, 600 according to the second and third embodiments, neither of the adjust bolts 505, 605 must be removed in the alteration of vehicle level, so that the adjustment of vehicle level can be effected in a simplified and rapid manner when compared with the wheel supporting structures 200, 300 in the first embodiment. Particularly, in the third embodiment in which left and right ground wheels can be vertically displaced simultaneously by the simple rotation of the single adjust bolt 605, and the vehicle level adjustment can be further simplified and made rapid, in addition to the possibility of continuously changing the vehicle level.

It will be easily comprehended that the applicable range of the present invention is not limited to the riding type working vehicle.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative and not restrective. The scope of the invention is indicated by the appended claims rather than by the foregoing description.

We claim:

1. A wheel supporting structure (200, 300, 400) for a riding type working vehicle (1) including
   a vehicle body (2) provided with a ground wheel (7, 8),
   comprising:
   a knuckle holder (80, 90) fixed to said vehicle body (2);
   said knuckle holder (80, 90) being formed with a plurality of fixing holes (83, 84, 85, 93, 94, 95) vertically spaced apart from each other;
   a knuckle (55, 73) for supporting said ground wheel (7, 8);
   an arm member (59, 77) vertically swingably pivoted at one end thereof on a portion of said vehicle body (2) including said knuckle holder (80, 90) and pivotally connected at the other end thereof to said knuckle (55, 73); and
   a bolt (99, 309) for fastening to fix said knuckle (55, 73) selectively to one of said fixing holes (83, 84, 85, 93, 94, 95).

2. A wheel supporting structure according to claim 1, wherein:
   said wheel supporting structure further comprises a reduction gearing (46, 64) steerably pivoted on said knuckle (55, 73);
   said reduction gearing (46, 64) comprises an input shaft (47, 65), and an output shaft (48, 66) having fixed thereto said ground wheel (7, 8);
   said input shaft (47, 65) is connected through an interconnection shaft (44, 62) to a wheel driving shaft (42, 23) operatively connected to a power source (3) of said riding type working vehicle (1); and
   said interconnection shaft (44, 62) is connected through universal joints (43 & 45, 61 & 63) to said wheel driving shaft (42, 23) and to said input shaft (47, 65) of said reduction gearing (46, 64), respectively.

3. A wheel supporting structure according to claim 1, further comprising:
   a knuckle arm (57) steerably attached to said knuckle (55, 73);
   said knuckle arm (57) having fixed thereto said ground wheel (7, 8); and
   said knuckle arm (57) being pivotably connected to one end (58b) of a tie rod (58) operatively connected to a steering wheel (9) of said riding type working vehicle (1);
   said fixing holes (483, 84, 485) of said knuckle holder (80) includes a middle fixing hole (84), an upper fixing hole (483) higher than said middle fixing hole (84), and a lower fixing hole (485) lower than said middle fixing hole (84);
   said tie rod (58) has a transverse length different from a transverse length (X) of said arm member (59); and
   said upper fixing hole (483) and said lower fixing hole (485) are offset in the same transverse direction, relative to a circle arc (311) with respect to one end (310) of a line segment (X2) having the same length as said arm member (59) and extending from said middle fixing hole (84) in parallel with said arm member (59) under a state in which said knuckle (55) is fixed by said bolt to said middle fixing hole (84).

4. A wheel supporting structure according to claim 3, wherein:
   said transverse length of said tie rod (58) is longer than said transverse length (X) of said arm member (59); and
   said upper fixing hole (483) and said lower fixing hole (485) of said knuckle holder (80) are inwardly offset in the transverse direction relative to said circle arc (311).

5. A wheel supporting structure according to claim 3, wherein:
   said transverse length of said tie rod is longer than said transverse length of said arm member (59); and
   said upper fixing hole and said lower fixing hole of said knuckle holder are outwardly offset in the transverse direction relative to said circle arc.

6. A wheel supporting structure according to claim 1, wherein:
   said one end of said arm member (59, 77) is pivotably connected to said knuckle holder (80, 90).

7. A wheel supporting structure according to claim 2, wherein:
   said reduction gearing (46, 64) is pivoted on said knuckle (55, 73) through a king pin (53 & 54, 71 & 72).

* * * * *

UNITED STATES PATENT AND TRADEMARK OFFICE
CERTIFICATE OF CORRECTION

PATENT NO. : 4,613,009

DATED : September 23, 1986

INVENTOR(S) : Kenji NAKAMURA et al

It is certified that error appears in the above-identified patent and that said Letters Patent are hereby corrected as shown below:

Column 1, line 44, after "been" insert --desiderated--.
Column 2, line 22, after "altered" insert --to be adjusted--;
          line 57, change "95" (first occurrence) to --85--.
Column 3, line 26, correct the spelling of --structure--.
Column 4, line 26, after "power" insert --from--.
Column 7, line 51, correct the spelling of --central--;
          line 64, correct the spelling of --linkage--.
Column 9, line 34, change "desinated" to --designated--;
          line 52, change "85" (first occurrence) to --84--.
Column 10, line 2, change "11" to --$\ell$1--;
           line 9, change "11" to --$\ell$1--;
           line 58, correct the spelling of --thereof--.
Column 12, line 2, change "famale-thread" to --female-thread--.
Column 13, lines 10 and 11, correct the spelling of
           --restrictive--.
Abstract, line 9, delete ",40".

Signed and Sealed this

Seventeenth Day of February, 1987

Attest:

DONALD J. QUIGG

*Attesting Officer*  *Commissioner of Patents and Trademarks*